United States Patent [19]

Adachi

[11] 4,142,155
[45] Feb. 27, 1979

[54] DIVERSITY SYSTEM

[75] Inventor: Fumiyuki Adachi, Yokohama, Japan

[73] Assignee: Nippon Telegraph and Telephone Public Corporation, Tokyo, Japan

[21] Appl. No.: 795,870

[22] Filed: May 11, 1977

[30] Foreign Application Priority Data

May 19, 1976 [JP] Japan .................................. 51-57678

[51] Int. Cl.² .............................................. H04B 7/06
[52] U.S. Cl. ........................................ 325/47; 325/56; 325/59; 325/154; 325/157; 325/158
[58] Field of Search ...................... 325/45, 47, 56, 59, 325/61, 145, 154, 156, 157, 158

[56] References Cited

U.S. PATENT DOCUMENTS 2,429,504  10/1947  Ziegler .................................. 325/59
3,713,040  1/1973  Page, Jr. .............................. 331/1 A
4,051,438  9/1977  Pickett et al. ......................... 325/45

OTHER PUBLICATIONS

"Modulation Theory," Harold S. Black, 1953, pp. 192-195, D. Van Nostrand Co. Inc.

Primary Examiner—Robert L. Griffin
Assistant Examiner—Marc E. Bookbinder
Attorney, Agent, or Firm—Burgess, Ryan and Wayne

[57] ABSTRACT

A common baseband digital signal is applied to a plurality of frequency modulators generating frequency modulated signals the carrier frequencies of which are equal to that of a common reference frequency oscillator, and the peak frequency deviations of the frequency modulated signals are made slightly different from each other.

8 Claims, 11 Drawing Figures

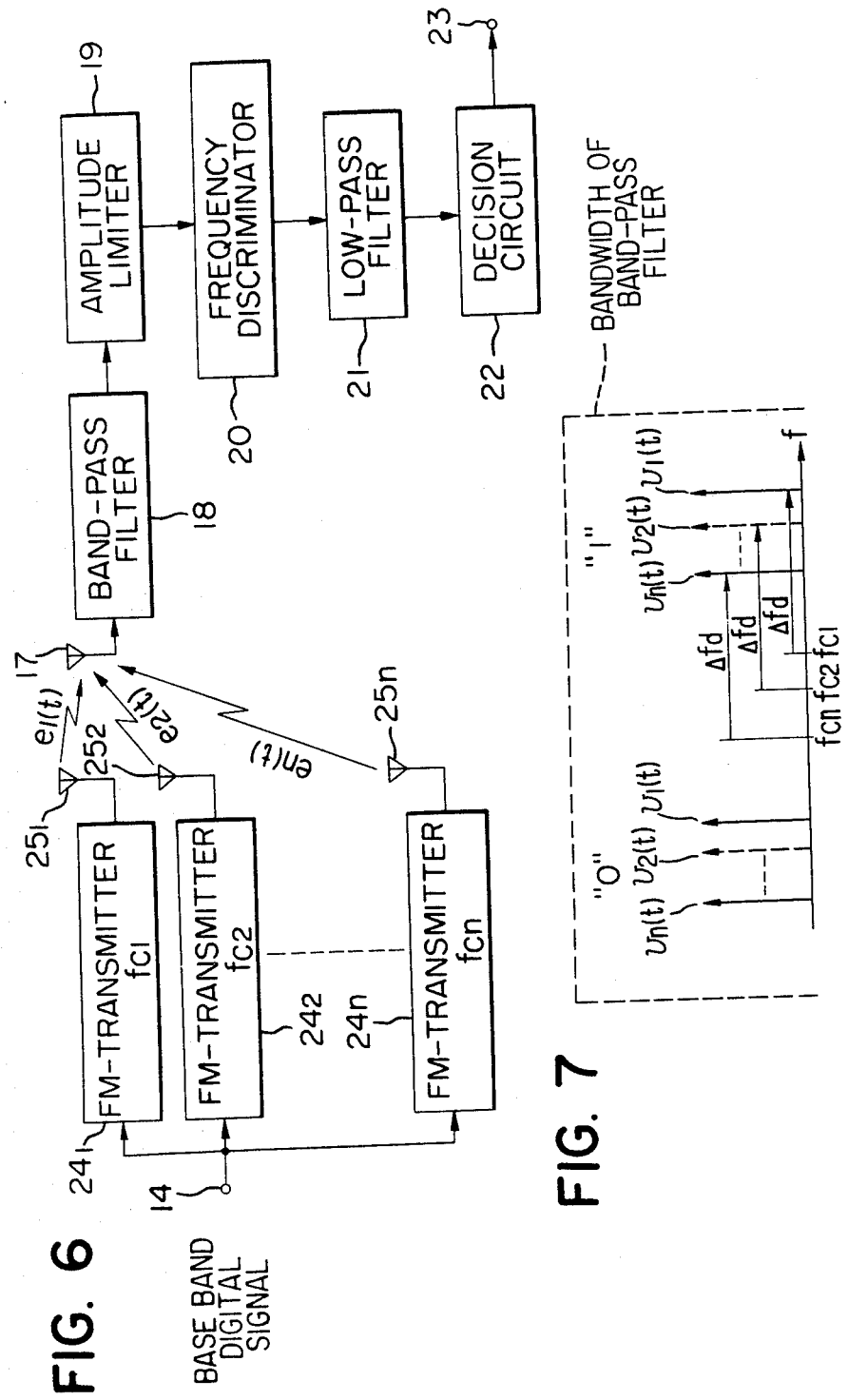

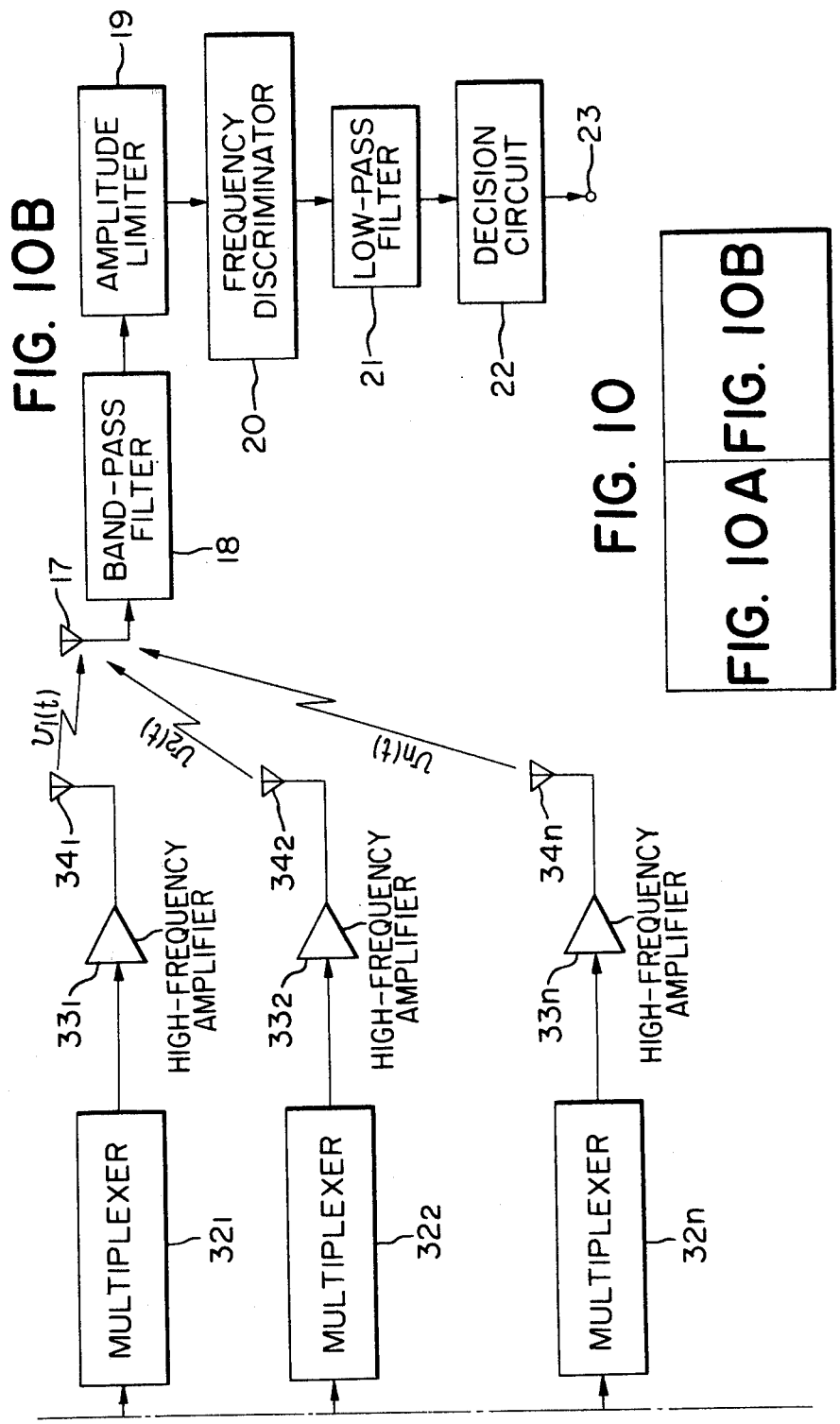

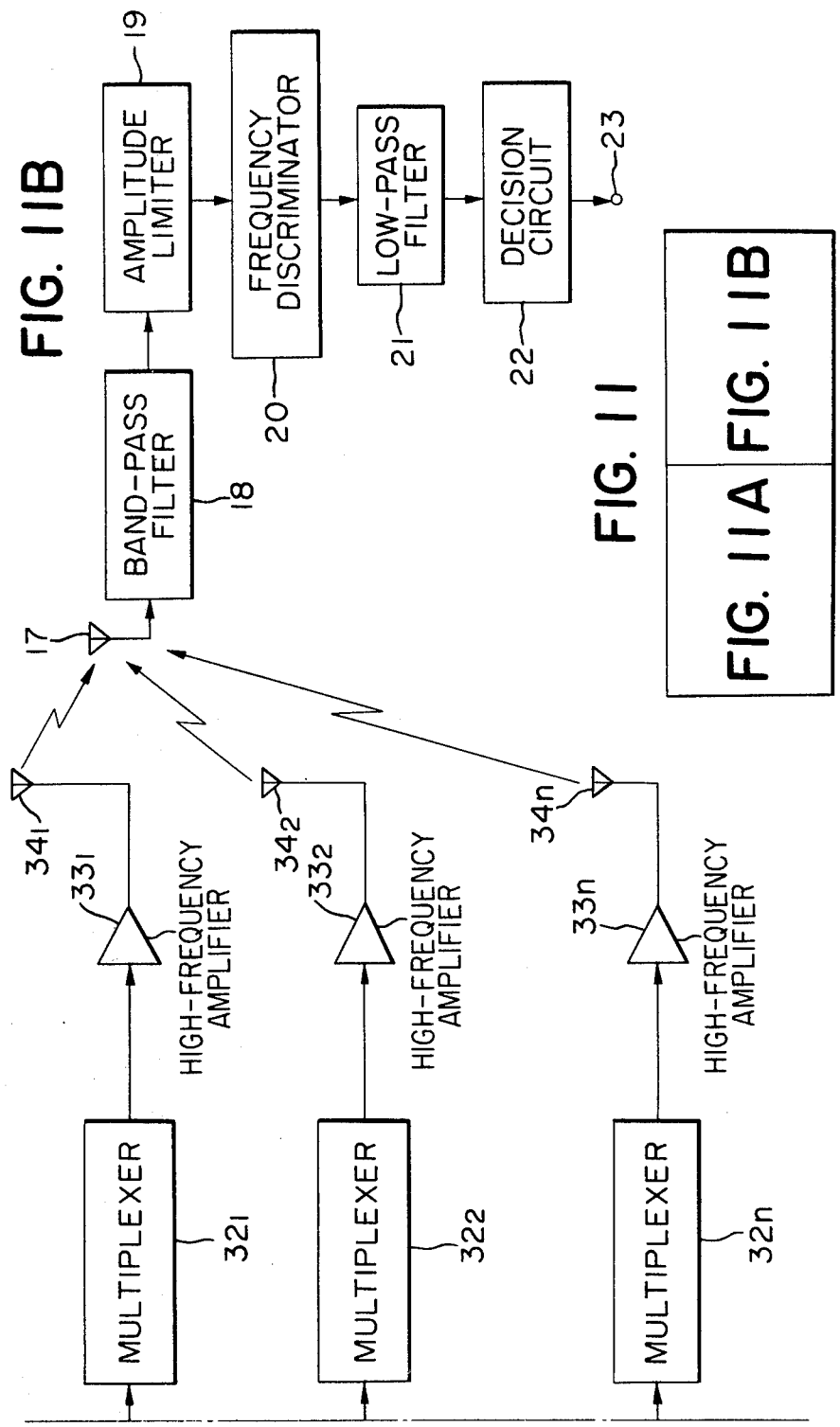

4,142,155

DIVERSITY SYSTEM

BACKGROUND OF THE INVENTION

The present invention relates to a diversity system used in land mobile radio for reducing the influence of multipath fading, thereby improving the digital transmission performance.

The interest in digital transmission in FM land mobile radio has been recently increasing. In land mobile radio, digital transmission between base station and mobile station is usually performed via multiple random paths, because of complex reflections by buildings. Thus, in case of UHF land mobile radio, rapid and deep multipath fading phenomenon will occur on the received signal as the vehicle moves. Under such multipath fading environment, digital transmission performance is greatly degraded. In order to obtain an average error rate equivalent to the digital transmission performance in an environment free of fading, the transmitter power must be considerably increased as compared with the case of no fading. However, in a land mobile radio system with such a high power, it is extremely difficult to design a transmitter which is simple in construction and inexpensive to manufacture.

In order to solve the above problems, a multi-carrier diversity system has been proposed wherein employing different carrier frequencies separated from each other by at least twice the baseband filter bandwidth related to the bit-rate of the baseband digital signal. However, in the case of a baseband digital signal of low bit-rate and high carrier frequency in the UHF range, the ratio of the difference between adjacent carrier frequencies to the carrier frequency becomes very small, and it becomes very difficult to separate carrier frequencies from each other by at least twice the baseband filter bandwidth.

SUMMARY OF THE INVENTION

One of the objects of the present invention is therefore to provide a diversity system which is very simple in construction yet is most effective in reducing the influence of multipath fading.

Another object of the present invention is to provide a diversity system wherein the peak frequency deviations are made different for each frequency modulated signal whereas the carrier frequencies are equal to each other.

To the above and other ends, the present invention provides a diversity system comprising a reference frequency oscillator, a plurality of frequency modulators each having means which generates frequency modulated signals the carrier frequencies of which are equal to that of said reference frequency oscillator and the peak frequency deviations of which are different from each other, a common baseband digital signal being applied to all of said plurality of frequency modulators, and the frequency modulated signals being transmitted from respective antennas connected to said plurality of frequency modulators, respectively.

BRIEF DESCRIPTION OF THE DRAWINGS

FIG. 3 is a block diagram of a transmitter and a receiver used in prior art mobile radios;

FIG. 6 is a block diagram of a prior multicarrier diversity system;

FIG. 7 shows the spectrum of the frequency modulated signals of the diversity system shown in FIG. 6;

DESCRIPTION OF THE PREFERRED EMBODIMENTS

Figure 1:
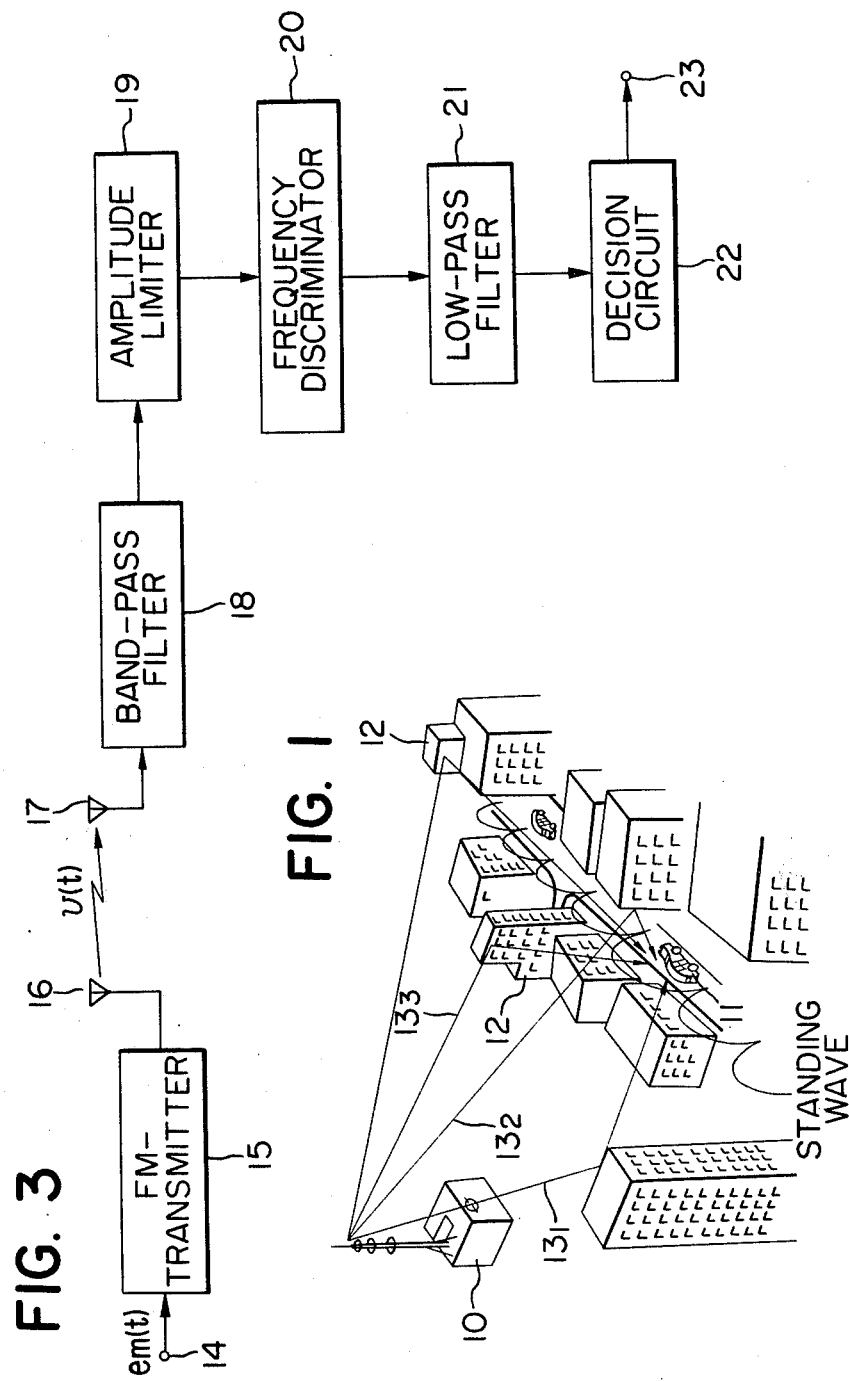
FIG. 1 is a view used for the explanation of fading in mobile radio.
Figure 2:
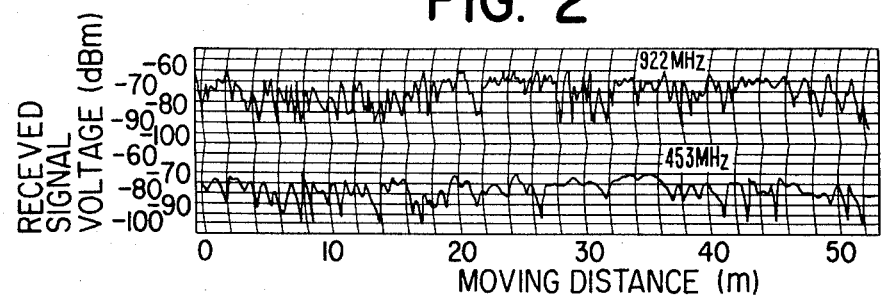
FIG. 2 shows a chart recording the received carrier power.

Prior to the description of the present invention, the influence of fading on digital signal transmission in land mobile radio will be described. Referring to FIG. 1, in land mobile radio there exist many buildings between a base station 10 and a mobile station 11 so that digital transmission between base station and mobile station usually employs not only by a direct line-of-sight route but also multiple random paths $13_1$, $13_2$, . . . because of reflection. Thus, in case of UHF land mobile radio, rapid and deep multipath fading phenomenon (variation in magnitude of the received signal envelope) occurs on the received signal as the mobile station 11 moves as indicated in FIG. 2. As shown in FIG. 3, according to known techniques a digital signal is applied to an input terminal 14 of an FM transmitter 15 of the base station 10, and a frequency modulated (FM) signal is generated and transmitted from an antenna 16. The received signal from an antenna 17 of the mobile station 11 is passed through a bandpass filter 18, a limiter 19, a frequency discriminator 20, a low pass filter 21 and a decision circuit 22 so that a regenerated digital signal is derived from an output terminal 23. However, because of the fading, it occurs very frequently that the regenerated digital signal is in error, i.e. different from the transmitted digital signal. This will be described with particular reference to FIG. 4 showing the waveforms at the various stages shown in FIG. 3.

Figure 4:
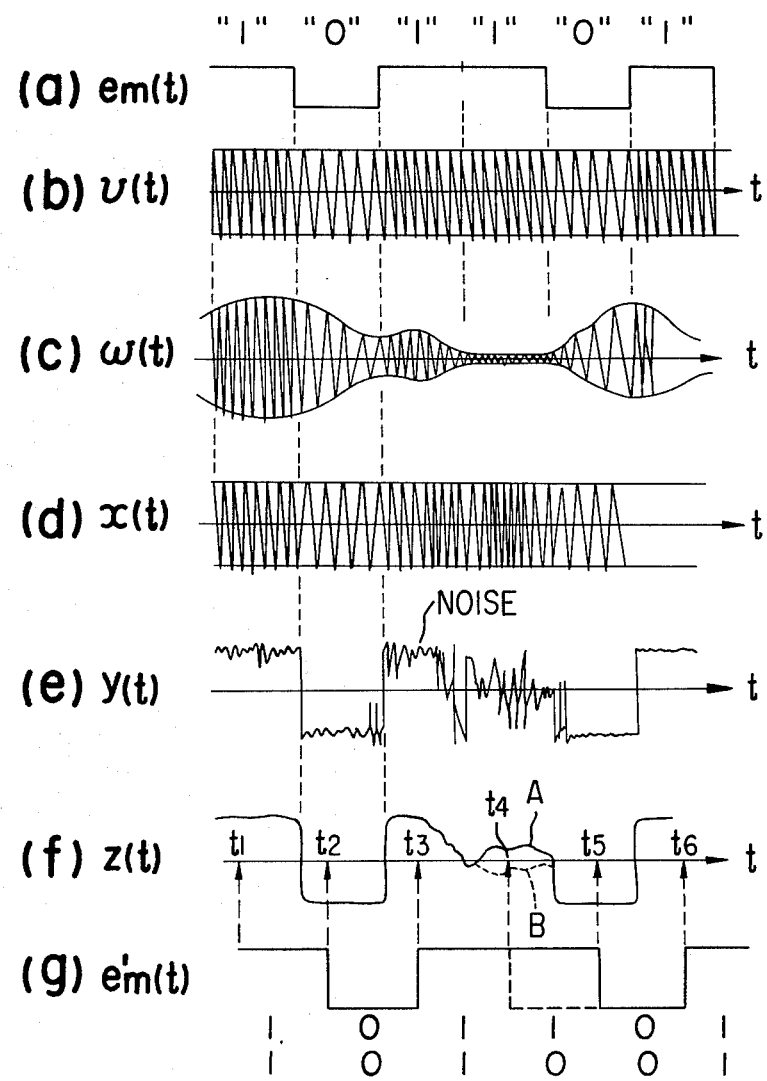
FIG. 4 shows waveforms of signals at various stages in the block diagram shown in FIG. 3.

The baseband digital signal $e_m(t)$ consisting of "1"s and "0"s is shown in FIG. 4(a). The output v(t) from the FM transmitter 15 as shown in FIG. 4(b) is transmitted from the antenna 16. As described above with reference to FIG. 1, the rapid and deep fading occurs on the received signal w(t). Due to fading, the received signal w(t) very frequently drops under the noise level as shown at portion A in FIG. 4(c), and the noise dominates. As a result, the output x(t) of the limiter 19 contains the amplified noise at the portion A of the received signal as indicated in FIG. 4(d), and at the output y(t) of the frequency discriminator 20, the noise dominates as indicated at (e) in FIG. 4. The output of the low-pass filter 21 is applied to the decision circuit 22 which decides whether the output is "1" or "0". The regenerated signal $e_m'(t)$ is often different from the transmitted digital signal $e_m(t)$ as shown at (g) in FIG. 4.

As a result, even if the base station 10 has transmitted the digital signal "1", the regenerated signal is not always "1". Thus the digital transmission performance is greatly degraded. When the received signal envelope drops under the noise level, the noise dominates as shown in FIG. 4(f) so that the low-pass filter output fluctuates randomly as indicated by the solid lines A and the broken lines B in FIG. 4(f) at or near the time $t_4$ when the decision of "0" or "1" must be made. As a consequence, the regenerated signal becomes "1" at one time and "0" at another time. That is, when the low-pass filter output level happens to be above the thereshold level as indicated by the solid line A in FIG. 4(f) at the time $t_4$, it is decided as "1", and the regenerated signal pattern (... 1, 0, 1, 1, 0, 1, ...) coincides with the transmitted signal pattern (... 1, 0, 1, 1, 0, 1, ...). However, when the low-pass filter output level is below the level as indicated by the broken lines B at (f) in FIG. 4 at the time $t_4$, it is decided as "0" so that the regenerated signal pattern (... 1, 0, 1, 0, 0, 1, ...) does not coincide with the transmitted signal pattern. As described above, when the envelope of the received signal is small, an error occurs due to the noise.

Figure 5:
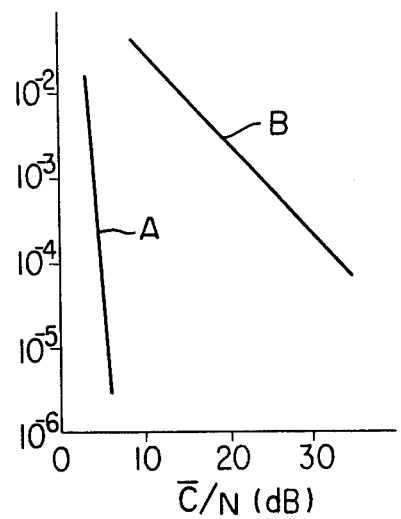
FIG. 5 shows the average error rate performance.

FIG. 5 shows average error rate performance, the average error rate being plotted as a function of the mean C/N (received carrier power to noise power) ratio. The curve A is for the case of no fading, whereas the curve B is for the case of Rayleigh fading. It is seen that in order to maintain the average error rate same the same as the average error rate for the case of no fading, a considerably greater transmitter power is required in land mobile radio.

To reduce the influence of fading, many diversity techniques have been proposed. One of the most useful techniques is multicarrier diversity. As shown in FIG. 6, the baseband digital signal applied to the input terminal 14 is delivered to a plurality of FM transmitters $24_1$, $24_2$, ..., and $24_n$ to generate a plurality of FM signals the carrier frequencies of which are separated from each other by at least twice the baseband filter bandwidth. The signals are transmitted from separate a antennas $25_1$, $25_2$, ..., and $25_n$. It is assumed that the carrier frequencies of the FM transmitters $24_1$, $24_2$, ..., and $24_n$ are $f_{c1}$, $f_{c2}$, ..., and $f_{cn}$, respectively and the corresponding spectrum of the FM signals is shown in FIG. 7. That is, the FM signals $v_1(t)$, $v_2(t)$, ..., and $v_n(t)$ transmitted from the antennas $25_1$, $25_2$, ..., and $25_n$ connected to their respective FM transmitters $24_1$, $24_2$, ..., and $24_n$ are deviated from the carrier frequencies $f_{c1}$, $f_{c2}$, ..., and $f_{cn}$ by $+\Delta f_d$ when "1" is transmitted and by $-\Delta f_d$ when "0" is transmitted.

Figure 8:
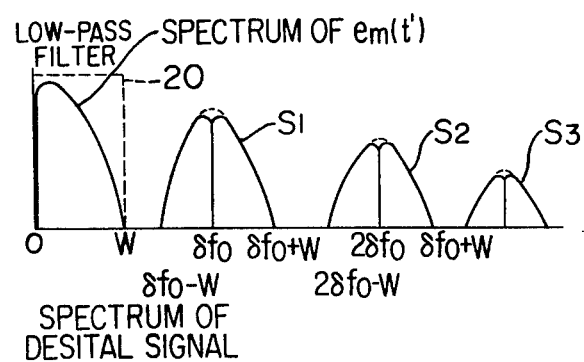
FIG. 8 is the spectrum of the output of a frequency discriminator of the receiver shown in FIG. 6.

The FM signals are received by the antenna 17 of the receiver of the type shown in FIG. 3, the band-pass filter 18 having a sufficient bandwidth to pass all of $w_1(t)$, $w_2(t)$, ..., and $w_n(t)$. As such a large number of waves are received simultaneously, the interference therebetween results in intermodulation beats in the output of the frequency discriminator 20 so that means must be provided to prevent the influence of the beats. FIG. 8 shows the spectrum of the output of the frequency discriminator 20 when two carrier frequencies $f_{c1}$ and $f_{c2}$ are used. It is assumed that the baseband digital signals have no DC component and have frequency components up to W Hz and that the low-pass filter 21 has a bandwidth of W Hz. The harmonic components $S_1$, $S_2$, $S_3$, ... due to beats appear and are centered around the frequencies which are the multiples of the difference frequency $\delta f_0 (= |f_{c1} - f_{c2}|)$ between the two frequencies $f_{c1}$ and $f_{c2}$. In order the prevent these harmonic components from falling into the bandwidth of the low-pass filter 20, the difference frequency $\delta f_0$ must be at least twice the baseband filter bandwidth W Hz.

Assume that the envelopes of the received FM signals $w_1(t)$ and $w_2(t)$ be $A_1$ and $A_2$. If the difference frequency $\delta f_0$ is larger than 2W Hz, it is considered that only the FM signal $w_1(t)$ is received when $A_1 > A_2$ and on the other hand when $A_2 > A_1$ only the FM signal $w_2(t)$ is received. As a result, even if the envelope $A_1$ of the FM signal $w_1(t)$ becomes small due to fading, the error does not occur on the regenerated signal envelopes when the amplitude $A_2$ of the other FM signal $w_2(t)$ is sufficiently large. However, when both envelopes of the FM signals $w_1(t)$ and $w_2(t)$ are lower than the noise level, error occurs on the regenerated signal, but this probability is much smaller than the probability thereof when only one FM signal is received, so that the influence of fading may be reduced.

Based upon the above described principle, a plurality of frequency modulators generate the FM signals separated by twice the baseband filter bandwidth W Hz, and the frequency modulated signals are transmitted from a plurality of antennas spaced apart from each other by a suitable distance. Thus the influence of fading may be substantially reduced. However, in case of a baseband digital signal of low-bit-rate and high carrier frequency in the UHF range, the ratio of the difference between adjacent carrier frequencies to the carrier frequency becomes very small, and then it becomes very difficult to separate carrier frequencies from each other by at least twice the baseband filter bandwidth.

Figure 9:
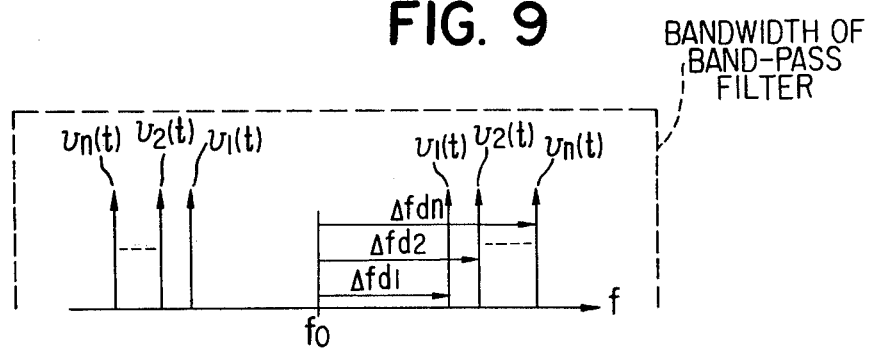
FIG. 9 is the spectrum of the frequency modulated signals of the present invention.

The principle of the present invention is that contrary to the prior system utilizing different carrier frequencies, different peak deviations are utilized so that the spectrum of a plurality of transmitted FM signals may be generated as shown in FIG. 9. More particularly a plurality of FM signals of a common carrier frequency $f_0$ are transmitted and received by a receiver of the type described in FIG. 6, the band-pass filter 18 having a bandwidth sufficient to pass all of the FM signals. Because of the interference or intermodulation between the signals, the output of the frequency discriminator contains beats so that, as described above, means must be provided to prevent the influence of the beats. When two signals are transmitted the spectrum of the output of the frequency discriminator 20 is just the same as that shown in FIG. 8 except that $\delta f_0 = |\Delta f d_1 - \Delta f d_2|$. When $\delta f_0 \geq 2W$, the harmonic components $S_1$, $S_2$, $S_3$, ... due to beats will not fall into the bandwidth of the low-pass filter 21 as described hereinbefore. Thus the effect of the present invention is similar to those attained by the prior diversity system utilizing a plurality of different carrier frequencies. That is, the influence of fading may be substantially reduced. Furthermore the present invention employing FM signals with the same carrier frequency and different peak frequency deviations may be more easily practiced than the prior art diversity systems utilizing different carrier frequencies.

Figure 10A:
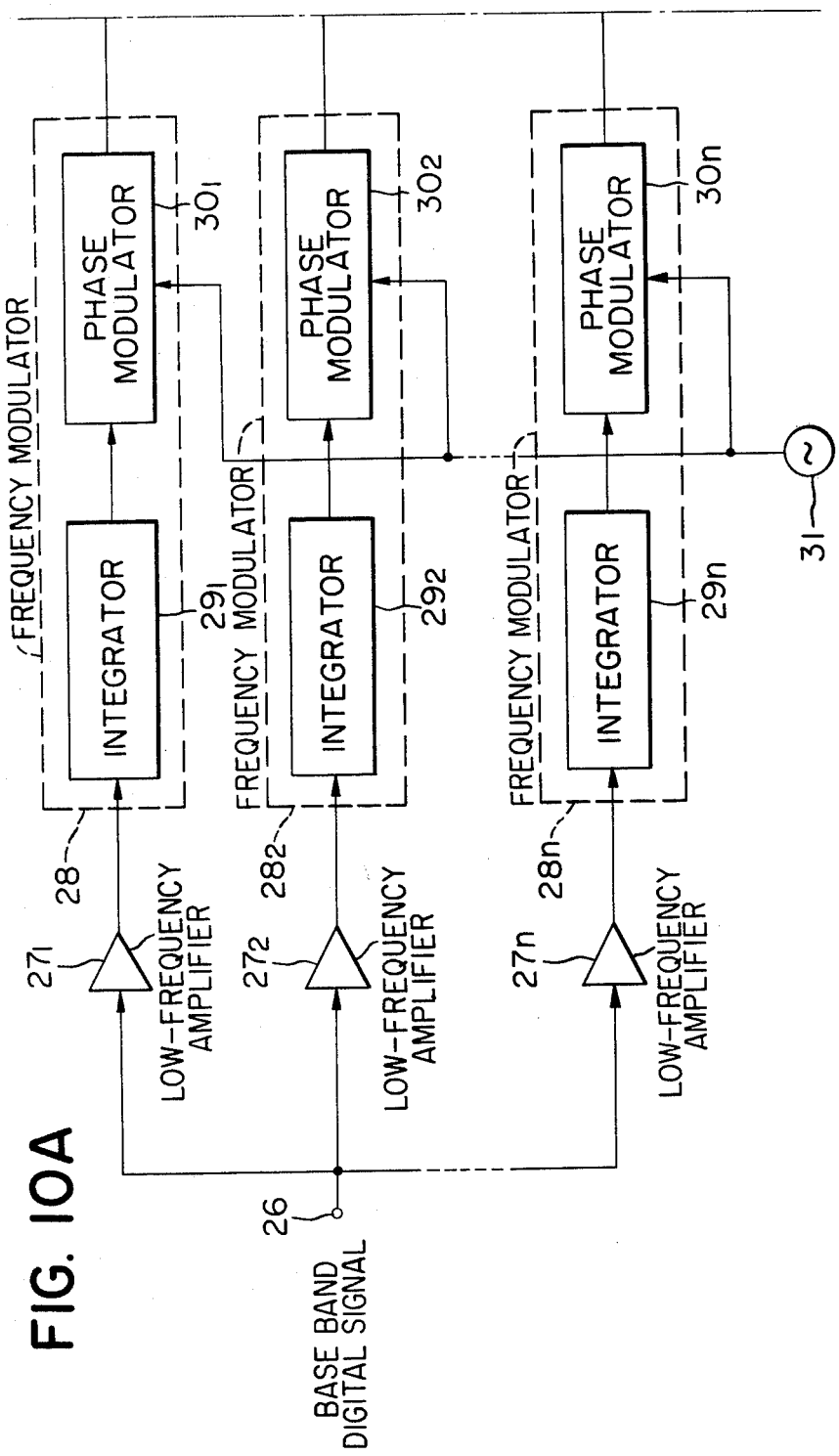
FIGS. 10 and 11 are block diagrams of first and second embodiments, respectively, of the present invention.

Next referring to FIG. 10, the first embodiment of the present invention will be described in detail. The baseband digital signal applied to an input terminal 26 is delivered to a plurality of baseband amplifiers $27_1$, $27_2$, ..., and $27_n$, the outputs of which are applied to frequency modulators $28_1$, $28_2$, ..., and $28_n$ each consisting of an integrator 29 and a phase modulator 30. The phase modulator 30 modulates the phase of the output of a frequency $f_s$ of an oscillator 31 with the output of the integrator 29. As a result, the output of the phase modulator 30 becomes the FM signal of a carrier frequency $f_s$, and is converted by a multiplexer 32 into the FM signal of the desired carrier frequency $f_0$. The output of the multiplexer 32 is amplified by a high frequency amplifier 33 to a desired power and transmitted from an antenna 34.

In the first embodiment with the above construction, the adjustment of the frequency deviation may be attained by adjusting the gains of the baseband amplifiers $27_1, 27_2, \ldots,$ and $27_n$. That is, the different gains of the baseband amplifiers $27_1, 27_2, \ldots,$ and $27_n$ result in different frequency deviations of the FM signals transmitted from the antennas $34_1, 34_2, \ldots,$ and $34_n$. With the multiplexers $32_1, 32_2, \ldots,$ and $32_n$ with a multiplex factor M, the carrier frequency $f_0$ of the output signal is given by $f_0 = Mf_s$, where $f_s$ is the frequency of the oscillator 31.

Under these conditions the FM signals with the peak frequency deviations $\pm \Delta f_{d1}, \pm \Delta f_{d2}, \ldots,$ and $\pm \Delta f_{dn}$ may be easily generated.

Figure 11A:
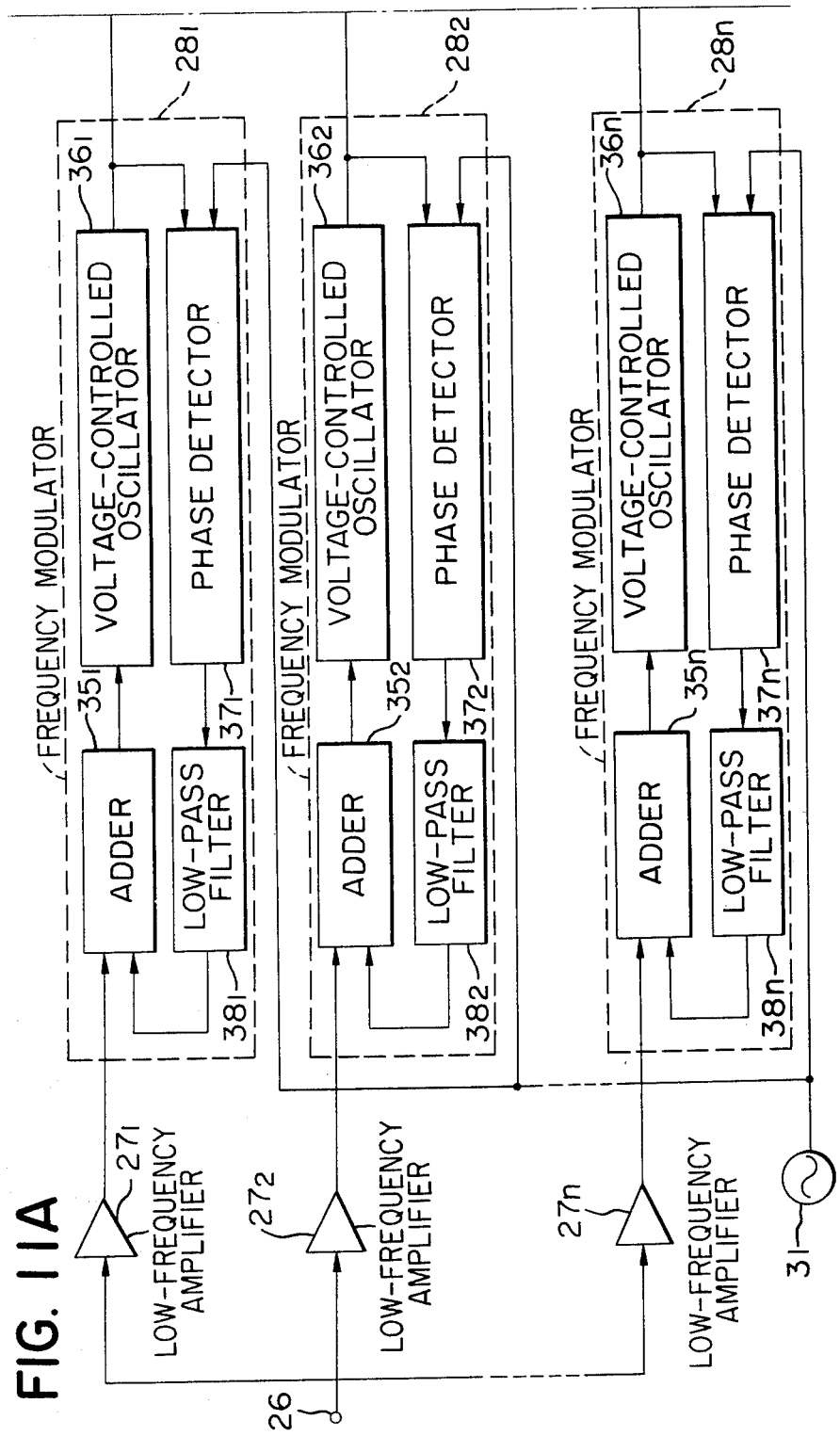

Next referring to FIG. 11 the second embodiment of the present invention will be described in detail. In the second embodiment, the frequency modulator 28 consists of a combiner 35, a voltage-controlled oscillator (VCO) 36 whose frequency is controlled by an external voltage, a phase detector 37 and a low-pass filter 38. The baseband digital signal applied to the input terminal 26 is amplified by the baseband amplifier 27 and then applied to the combiner 35. The output of the oscillator 31 is applied to the phase detectors $37_1, 37_2, \ldots,$ and $37_n$.

Next the principle of operation of the second embodiment with the above construction will be described. First the fundamental principle will be explained. If there is no signal at the input terminal 25 the result would be a phase locked loop, which is well known and is explained in detail in "Phase-lock Techniques", F. M. Gardner, John-Wiley Sons, Inc., New York, 1967. In the phase-locked loop, the outputs of the VCO 36 and the output of the reference oscillator 31 are applied to the phase detector 37 so that their phase difference may be detected and the output representative of the difference in phase may be derived. Only the DC component of the output of the phase detector 37 is passed through the corresponding low pass filter 38 and is applied to the corresponding VCO 36 as a control voltage. When the frequency of the VCO 36 is lower than the reference frequency, the output voltage of the low pass filter 38 raises, increasing the frequency of the VCO 36. On the other hand, when the frequency of the VCO 36 is higher than the reference frequency, the output voltage of the low pass filter 38 drops, decreasing the frequency of the VCO 36. As a result, the VCO 36 is always pulled into the phase locked state with the reference frequency oscillator 31 in such a manner that the frequency of the VCO 36 is exactly equal to that of the reference frequency oscillator 31. Thus the frequencies of all of the VCOs $36_1, 36_2, \ldots,$ and $36_n$ are equal to the frequency $f_s$ of the reference frequency oscillator 31.

Next the principle of operation will be described. The baseband digital signal which has been amplified by the baseband amplifiers 27 and the outputs of the low pass filters 38 are applied to the corresponding combiners 35, and their sum is applied as a control voltage to the corresponding VCO$_s$ 36. That is, the output voltage of the low pass filter 38 controls the carrier frequency, whereas the output of the baseband amplifier 27 controls the frequency deviation of the FM signal. As described above, the frequency of the VCO 36 is in proportion to the control voltage so that the VCO generates FM signal of which carrier frequency is equal to that of the reference frequency oscillator 31.

This FM signal is applied to the corresponding phase detector 37 and is compared in phase with the output of the reference frequency oscillator 31, and the phase detector output having the frequency components similar to those of the baseband digital signal is derived. However, the low pass filter 38 does not pass the components generated as a result of the frequency modulation with the baseband digital signal, and only pass the DC component. The DC component controls the carrier frequency, and is exactly equal to the output of a low-pass filter without signal at the input terminal 26. As described above, the feedback loop, the VCO 36 → the phase detector 37 → the low-pass filter 38 → the VCO 36 is established so that the carrier frequency may be always equal to the frequency of the oscillator 31.

With the frequency modulators $28_1, 28_2, \ldots,$ and $28_n$ each utilizing a phaselock technique, the carrier frequencies are exactly equal to the frequency of the oscillator 31, and the output of the oscillator 31 is applied to each of the frequency modulators $28_1, 28_2, \ldots,$ and $28_n$ so that the carrier frequencies of the FM signals generated by each frequency modulators are same. The adjustment of the peak frequency deviations may be accomplished by adjusting the gains of the baseband amplifiers $27_1, 27_2, \ldots,$ and $27_n$ as described above.

What is claimed is:

1. A diversity system comprising
   (a) a reference frequency oscillator,
   (b) a plurality of frequency modulators each having means which generates frequency modulated signals the carrier frequencies of which are equal to each other and to that of said reference frequency oscillator,
   (c) said plurality of frequency modulators generating frequency modulated signals with a common baseband digital signal being applied to said plurality of frequency modulators in such a manner that the peak frequency deviations of said modulated signals are different from each other, and
   (d) the frequency modulated signals being transmitted from respective antennas connected to said plurality of frequency modulators, respectively.

2. A diversity system as set forth in claim 1 wherein each of said plurality of frequency modulators consists of an integrator and a phase modulator.

3. A diversity system as set forth in claim 1 wherein each of said plurality of frequency modulators consists of a combiner and a phase locked loop.

4. A diversity system as set forth in claim 3 wherein said phase locked loop consists of a voltage-controlled oscillator, a phase detector, and low pass filter.

5. A diversity system as set forth in claim 1, further comprising a receiver including a predetection filter having a bandwidth capable of receiving all of the modulated carriers transmitted from said transmitters.

6. A diversity system as set forth in claim 2, further comprising a receiver including a predetection filter having a bandwidth capable of receiving all of the modulated carriers transmitted from said transmitters.

7. A diversity system comprising:
   (a) at least two angularly modulating transmitters;
   (b) carriers in each transmitter being angularly modulated by a common baseband digital signal to different peak frequency deviations of said modulated carriers from each other; and
   (c) said modulated carriers being transmitted from respective antennas connected to each transmitter.

8. A diversity system comprising:
   (a) at least two angularly modulating transmitters;
   (b) carriers of identical frequency in each transmitter being angularly modulated by a common baseband digital signal to different peak frequency deviations of said modulated carriers from each other; and
   (c) said modulated carriers being transmitted from respective antennas connected to each transmitter.

* * * * *

UNITED STATES PATENT OFFICE
CERTIFICATE OF CORRECTION

Patent No. 4,142,155      Dated February 27, 1979

Inventor(s) Fumiyuki Adachi

It is certified that error appears in the above-identified patent and that said Letters Patent are hereby corrected as shown below:

FIGURE 2: "RECEVED" should be --RECEIVED--.

Column 1, line 17: "environment" should be --conditions--.

line 27: "wherein" should be cancelled.

Column 2, line 27: "phenomenon" should be --phenomena--.

line 29: after "moves" insert a comma.

Column 4, line 1: "2W" should be --ZW--.

Signed and Sealed this

*Eleventh* Day of *September 1979*

[SEAL]

*Attest:*

LUTRELLE F. PARKER
*Attesting Officer*     *Acting Commissioner of Patents and Trademarks*